United States Patent
Li et al.

(10) Patent No.: US 8,249,584 B2
(45) Date of Patent: Aug. 21, 2012

(54) PORTABLE ELECTRONIC DEVICE WITH CONTROLLERS

(75) Inventors: Xiao-Guang Li, Shenzhen (CN); Han-Che Wang, Taipei Hsien (TW); Ruey-Shyang You, Taipei Hsien (TW); Shih-Tsai Liu, Taipei Hsien (TW); Hua-Dong Cheng, Shenzhen (CN); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 645 days.

(21) Appl. No.: 12/412,375

(22) Filed: Mar. 27, 2009

(65) Prior Publication Data
US 2009/0325637 A1 Dec. 31, 2009

(30) Foreign Application Priority Data
Jun. 30, 2008 (CN) .......................... 2008 1 0302428

(51) Int. Cl.
*H04W 24/00* (2009.01)
*H04M 1/00* (2006.01)
*G09G 5/00* (2006.01)
*H04N 7/12* (2006.01)
*A63B 71/00* (2006.01)

(52) U.S. Cl. ..................... 455/425; 455/550.1; 345/156; 375/240.29; 482/8

(58) Field of Classification Search .................. 455/574, 455/127.5, 343.1–343.2, 343.5, 556.1, 118, 455/156, 178, 194, 307, 344
See application file for complete search history.

(56) References Cited

U.S. PATENT DOCUMENTS

| 6,407,325 | B2* | 6/2002 | Yi et al. ........................... 84/610 |
| 6,889,043 | B2* | 5/2005 | Okazaki et al. ............ 455/435.1 |
| 6,944,287 | B2* | 9/2005 | Mori ........................ 379/390.01 |
| 6,947,728 | B2* | 9/2005 | Tagawa et al. ............. 455/414.1 |
| 7,123,945 | B2* | 10/2006 | Kokubo ........................ 455/566 |
| 7,526,585 | B2* | 4/2009 | Jeong ............................... 710/72 |
| 7,698,711 | B2* | 4/2010 | Jeong ............................ 718/107 |
| 2003/0083106 | A1* | 5/2003 | Seo ................................ 455/566 |
| 2003/0119562 | A1* | 6/2003 | Kokubo ........................ 455/566 |
| 2006/0174307 | A1* | 8/2006 | Hwang et al. ................. 725/132 |
| 2006/0209036 | A1* | 9/2006 | Shin et al. ..................... 345/172 |

(Continued)

FOREIGN PATENT DOCUMENTS

CN 101068409 11/2007

(Continued)

*Primary Examiner* — Dwayne Bost
*Assistant Examiner* — Scott Trandai
(74) *Attorney, Agent, or Firm* — Altis Law Group, Inc.

(57) ABSTRACT

The present invention provides a portable electronic device. The device includes a first controller, a second controller, a mode switch unit, and a main controller. The mode switch unit is for a user to operate thereby generating a mode switch instruction. The main controller is for switching a work mode according to the mode switch instruction from the mode switch unit. When the mode switch unit generates a first mode switch instruction, the device enters a common work mode whereby the main controller activates the first controller and the second controller to be on standby; and when the mode switch unit generates a second mode switch instruction, the device enters a single work mode whereby the main controller activates only one of the first controller and the second controller to be on standby.

1 Claim, 6 Drawing Sheets

U.S. PATENT DOCUMENTS

| | | | |
|---|---|---|---|
| 2006/0229106 A1* | 10/2006 | Otaka et al. | 455/566 |
| 2007/0025311 A1* | 2/2007 | Jeong et al. | 370/338 |
| 2007/0103434 A1* | 5/2007 | Lian et al. | 345/156 |
| 2007/0118870 A1* | 5/2007 | Yoo et al. | 725/131 |
| 2007/0225022 A1* | 9/2007 | Satake | 455/466 |
| 2007/0240073 A1* | 10/2007 | McCarthy et al. | 715/767 |
| 2007/0285387 A1* | 12/2007 | Cheng et al. | 345/156 |
| 2008/0004080 A1* | 1/2008 | Li et al. | 455/564 |
| 2008/0004734 A1* | 1/2008 | Li et al. | 700/94 |
| 2009/0011794 A1* | 1/2009 | Seo | 455/557 |
| 2009/0052555 A1* | 2/2009 | Mak-Fan et al. | 375/240.29 |
| 2009/0240842 A1* | 9/2009 | Wang et al. | 710/14 |
| 2010/0016017 A1* | 1/2010 | Li et al. | 455/556.1 |
| 2011/0053641 A1* | 3/2011 | Lee et al. | 455/556.1 |

FOREIGN PATENT DOCUMENTS

| | | |
|---|---|---|
| TW | 200516496 | 5/2005 |
| TW | 200725508 | 7/2007 |

* cited by examiner

PORTABLE ELECTRONIC DEVICE WITH CONTROLLERS

TECHNICAL FIELD

The disclosure relates to portable electronic devices and, more particularly, to a portable electronic device including three controllers.

GENERAL BACKGROUND

Portable electronic devices usually have multiple functional applications, for example, a mobile phone can have not only a short messaging service (SMS) function and a telephone call function, but also an audio/video playing function. In general, an audio/video processing module and a communication module are integrated in a main central controller (CPU) of the mobile phone. However, over-integration of operations degrades the processing ability of the main CPU by slowing down the processing speed of the main CPU. Especially, when a user wants to utilize only one of the functions, such as when playing a song, the mobile phone runs not only the Mp3 function, but also the RF wireless function which is not being used at the moment.

Another shortcoming is that the only way to turn off the RF wireless function, such as when a passenger is on a plane, the mobile phone must be completely shut down, which means no access to the other functions.

Accordingly, what is needed in the art is a portable electronic device including three controllers that overcomes the aforementioned deficiencies.

BRIEF DESCRIPTION OF THE DRAWINGS

The components in the drawings are not necessarily drawn to scale, the emphasis instead being placed upon clearly illustrating the principles of the portable electronic device. Moreover, in the drawings, like reference numerals designate corresponding parts throughout the several views.

DETAILED DESCRIPTION OF THE EMBODIMENTS

Figure 1:
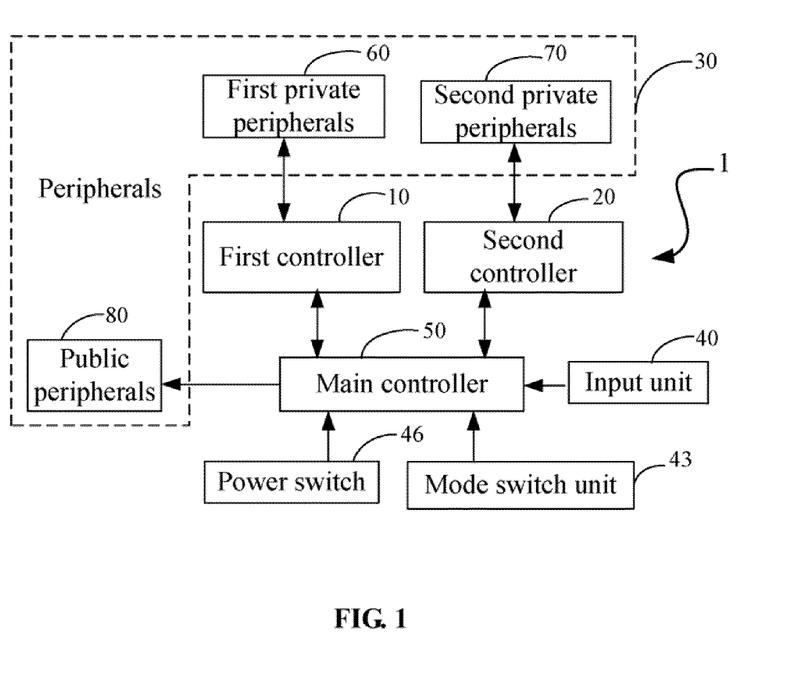
FIG. 1 is a block diagram of a hardware infrastructure of a portable electronic device in accordance with an exemplary embodiment.

FIG. 1 is a block diagram of a hardware infrastructure of a portable electronic device in accordance with an exemplary embodiment. The portable electronic device 1 (hereinafter "the device 1") includes a first controller 10, a second controller 20, a main controller 50, an input unit 40, a power switch 46, a mode switch unit 43, and a set of peripherals 30. The set of peripherals 30 include first private peripherals 60, second private peripherals 70, and public peripherals 80. The power switch 46 is configured for turning the device 1 on and off. The input unit 40 is configured for generating input signals from a user.

The first controller 10 is configured for controlling a first group of functional applications and generating a first group of functional interfaces. The first private peripherals 60, connected to the first controller 10, are configured for receiving control signals from the first controller 10. The second controller 20 is configured for controlling a second group of functional applications and generating a second group of functional interfaces. The second private peripherals 70, connected to the second controller 20, are configured for receiving control signals from the second controller 20.

The mode switch unit 43, connected to the main controller 50, is configured for a user to operate thereby generating a mode switch instruction. The mode switch unit 43 may be any kind of suitable switch or key. The main controller 50 is configured for switching a work mode according to the mode switch instruction from the mode switch unit 43. When the mode switch unit 43 generates a first mode switch instruction, the device 1 enters a common work mode whereby the main controller 50 activates the first controller 10 and the second controller 20 to be on standby. When the mode switch unit 43 generates a second mode switch instruction, the device 1 enters a single work mode whereby the main controller 50 activates only one of the first controller 10 and the second controller 20 to be on standby.

While the device 1 is in the common work mode, the main controller 50 is further configured for switching between the first controller 10 and the second controller 20 according to the input signals from the input unit 40. The main controller 50 includes a plurality of switch circuits (not shown) for switching between the first controller 10 and the second controller 20. For example, when the input unit 40 generates a first input signal, the main controller 50 switches from the first controller 10 to the second controller 20 and the second controller 20 activates and controls the second group of functional applications; when the input unit 40 generates a second input signal, the main controller 50 switches from the second controller 20 to the first controller 10 and the first controller 10 activates and controls the first group of functional applications.

The public peripherals 80, connected to the main controller 50, are configured for receiving control signals from the main controller 50. For example, when the main controller 50 switches from the functional interfaces of the first controller 10 to the functional interfaces of the second controller 20, the second controller 20 controls the public peripherals 80; when the main controller 50 switches from the functional interfaces of the second controller 20 to the functional interfaces of the first controller 10, the first controller 10 controls the public peripherals 80. The first private peripherals 60, the second private peripherals 70, and the public peripherals 80 may be all connected to the main controller 50 and all receive control signals from the main controller 50.

When the device 1 is turned on, it enters the work mode it was in when last turned off. For example, if in the common work mode when the device 1 is shut down, it will be in the common work mode when it is started again.

In an exemplary embodiment, the first controller 10 is a media player controller, such as a moving picture experts group audio layer3 (Mp3) controller, a moving picture experts group audio layer4 (Mp4) controller, and the like, for controlling audio/video applications. The second controller 20 is a mobile communications controller, such as a global system for mobile communications (GSM) controller, a general packet radio service (GPRS) controller, a code division multiple access (CDMA) controller, and the like, for controlling wireless communication applications.

Figure 2:
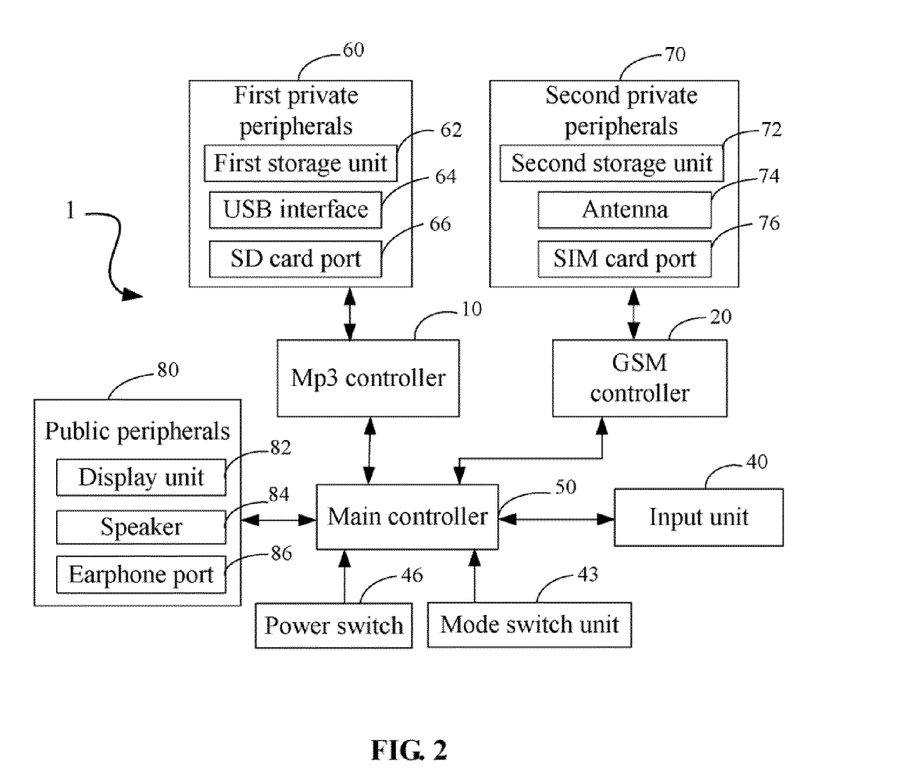
FIG. 2 is an exemplary block diagram of the portable electronic device in accordance with an exemplary embodiment.

FIG. 2 is an exemplary block diagram of the portable electronic device in accordance with an exemplary embodiment. In the exemplary embodiment, the first controller is an Mp3 controller 10 for controlling an MP3 work state of the device 1, and the second controller is a GSM controller 20 for controlling a GSM work state of the device 1. In the common work mode, the device 1 alternatively operates in one of the Mp3 work state and the GSM work state. In the single work mode, the device 1 operates in only the Mp3 work state.

The first private peripherals 60 include a first storage unit 62, a universal serial bus (USB) interface 64, and a secure digital (SD) card port 66. The first storage unit 62 is configured for storing programs of functional applications of the first controller 10 and media contents. The media contents include, but are not limited to, a plurality of Mp3 files. The second private peripherals 70 include a second storage unit 72, an antenna 74, and a subscriber identity module (SIM) 76. The second storage unit 72 is configured for storing programs of functional applications of the second controller 20 and communication data. The communication data include, but are not limited to, short messages and phonebook entries.

The public peripherals 80 include a display unit 82, a speaker 84, and an earphone port 86. When in the common work mode the main controller 50 switches one controller to the other controller according to the input signals from the input unit 40, the display unit 82 switches functional interfaces of one controller to functional interfaces of the other controller. For example, when the device 1 enters the Mp3 work state, the Mp3 controller 10 controls the display unit 82 to display the Mp3 player interface, and the speaker 84 or the earphone port 86 to, for example, output sound corresponding to an MP3 file. When the device 1 enters the GSM work state, the GSM controller 20 controls the display unit 82 to display the short messages and phonebook interfaces, the speaker 84 to output, for example, a ring tone when the antenna 74 receives incoming call signals from an external wireless communications system (not shown), and the earphone port 86 to receive audio signals for the earphone.

Figure 3:
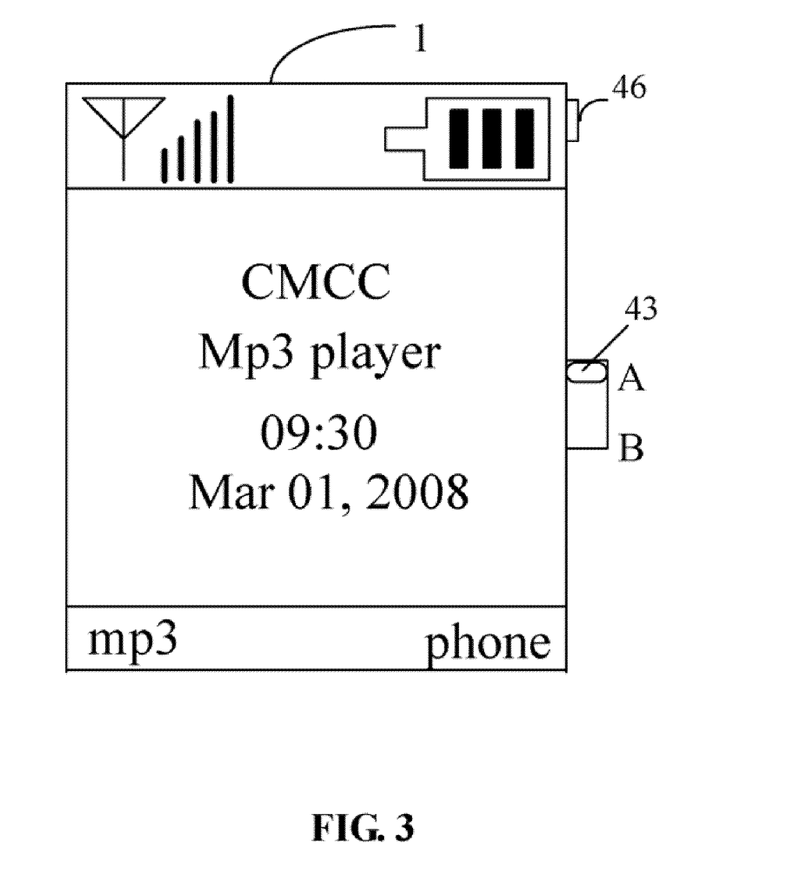
FIG. 3 is a first schematic interface view of the portable electronic device of FIG. 2 in a common work mode.

FIG. 3 is a first schematic interface view of the portable electronic device of FIG. 2 in a common work mode. In the common work mode, the display unit 82 displays a public functional interface. For example, in the exemplary embodiment, as shown in FIG. 3, the mode switch unit 43 is a switch and has two positions, such as "A", and "B." The "A" position represents that the device 1 is in the common work mode, and the "B" position represents that the device 1 is in the single work mode.

When the mode switch unit 43 lies in the "A" position and the device 1 is in a standby state, the main controller 10 controls the public functional interface to display a first group of basic information, for example, signal strength, battery capacity, current time and date (e.g., 09:30 am, and Sep. 10, 2008), a service provider of the device 1 (e.g., China Mobile Communications Corporation (CMCC)), and a media player function (e.g., Mp3 player). The public functional interface further provides two optional icons for entering the two work states. In addition, when the device 1 is in the standby state, the GSM controller 20 is in a standby state and the Mp3 controller 10 is in an inactivate state.

Figure 4:
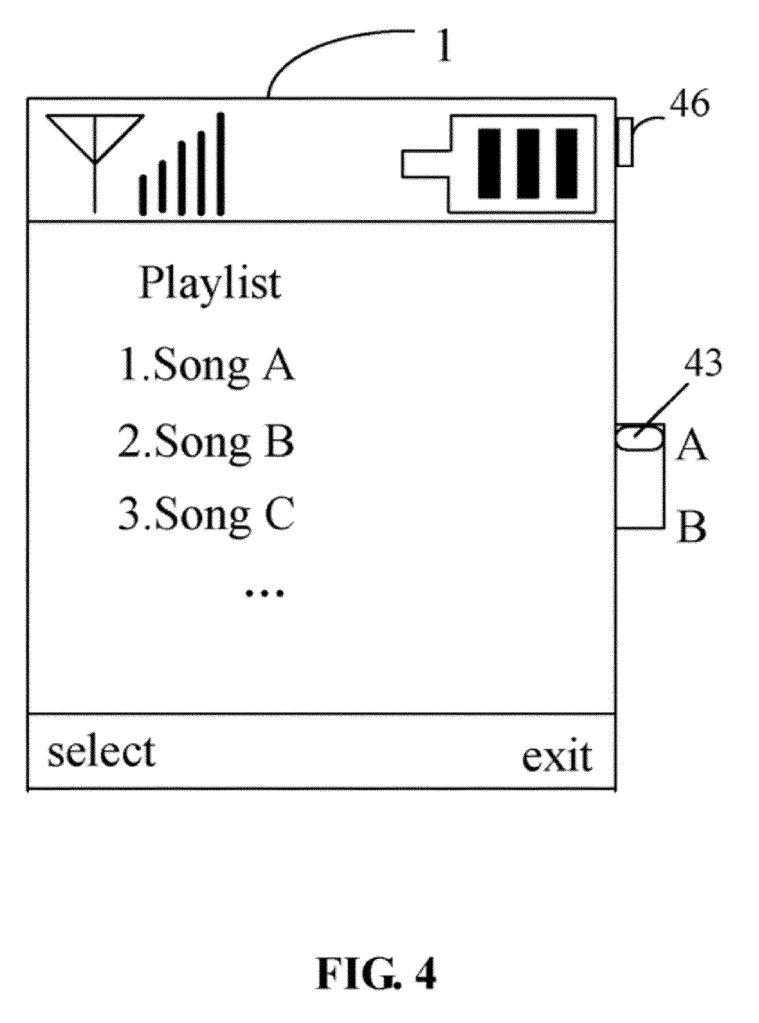
FIG. 4 is a second schematic interface view of the portable electronic device of FIG. 2 in the common work mode.

When the main controller 50 receives an input signal for entering the Mp3 work state in response to a press operation on the Mp3 icon from the input unit 40, the main controller 50 switches the device 1 to the Mp3 work state, thereafter the Mp3 controller 10 enters an active state, and controls corresponding functional applications, for example, playing an Mp3 file. Furthermore, in the Mp3 work state, the first private peripherals 60 and the public peripherals 80 also enter the activate state. For example, as shown in FIG. 4, when the input unit 40 receives a play input signal, the display unit 82 displays a playlist interface and the Mp3 controller 10 fetches a song file from the first storage unit 62 and controls the speaker 84 to output sound, and the display unit 82 displays the playing interface.

When the main controller 50 receives an input signal for entering the GSM work state in response to a press operation on the Phone icon from the input unit 40, the main controller 50 switches the device 1 to the GSM work state, thereafter, the GSM controller 20 enters an activate state, and controls corresponding functional applications, for example, writing a short message. Furthermore, in the GSM work state, the second private peripherals 70 and the public peripherals 80 also enter the activate state. For example, when the input unit 40 receives a telephone call input signal, the GSM controller 20 controls the antenna 74 to outgo the call, and the display unit 82 displays the calling interface.

Figure 5:
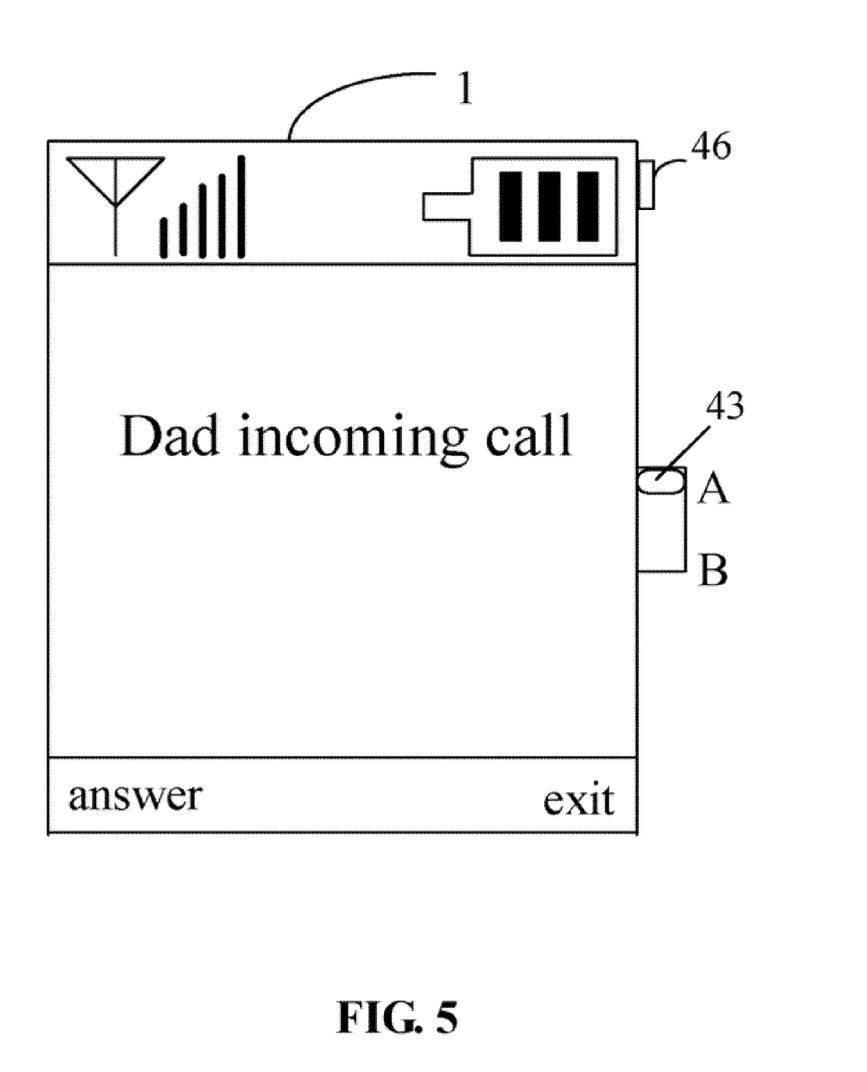
FIG. 5 is a third schematic interface view of the portable electronic device of FIG. 2 in the common work mode.

When the antenna 74 receives incoming call signals from the external wireless communications system while the device 1 is playing an Mp3 file, as shown in FIG. 5, the Mp3 controller 10 stops playing the Mp3 file, and the main controller 50 switches the Mp3 work state to the GSM work state, that is, the main controller 50 switches the Mp3 controller 10 to the GSM controller 20, thereafter, the Mp3 controller 10 enters the inactivate state, and the GSM controller 20 enters the activate state and controls the speaker 84 to output a ring tone.

Figure 6:
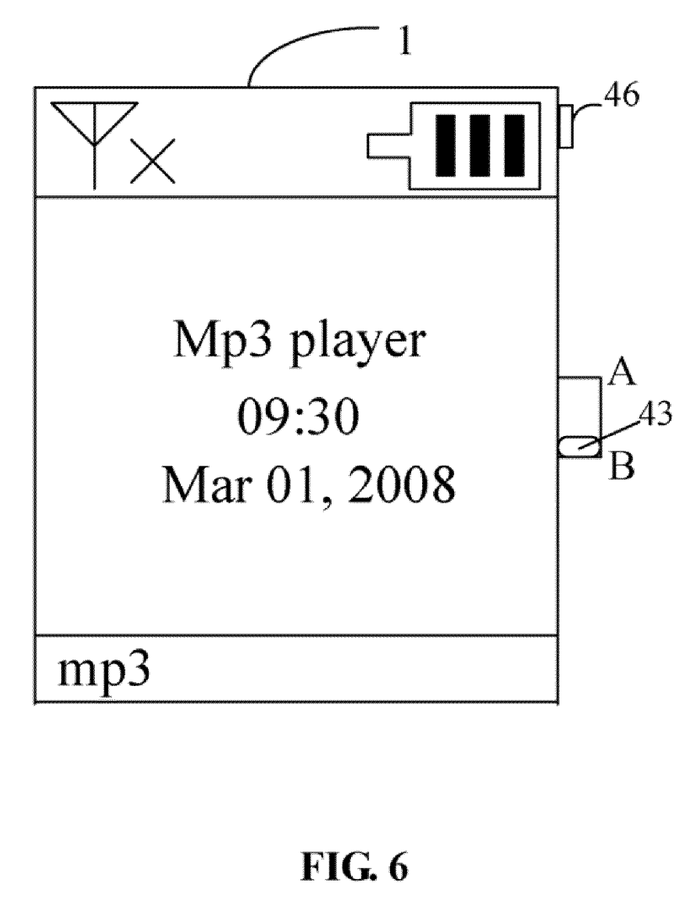
FIG. 6 is a schematic interface view of the portable electronic device of FIG. 2 in a single work mode.

FIG. 6 is a schematic interface view of the portable electronic device of FIG. 2 in a single work mode. When the mode switch unit 43 lies in the "B" position and generates the second mode switch instruction, the main controller 50 controls the device 1 to enter the single work mode. The main controller 50 controls the Mp3 controller 10 to be in the Mp3 work state and the GSM controller 20 is off. The display unit 80 displays an Mp3 function interface for displaying a second group of basic information, as shown in FIG. 6, and the second group of basic information includes battery capacity, current time and date (e.g., 09:30 am, and Sep. 10, 2008), and a media player function (e.g., Mp3 player). The Mp3 functional interface further provides an icon for entering the Mp3 work state.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A portable electronic device comprising:
    a first controller configured for controlling a first group of functional applications and generating a first group of functional interfaces;
    a second controller configured for controlling a second group of functional applications and generating a second group of functional interfaces;
    a mode switch unit configured for a user to operate for generating a mode switch instruction; and
    a main controller configured for switching a work mode according to the mode switch instruction from the mode switch unit;
    wherein when the mode switch unit generates a first mode switch instruction, the device enters a common work mode in which the main controller activates the first controller and the second controller to be on standby; and when the mode switch unit generates a second mode switch instruction, the device enters a single work mode in which the main controller activates only one of the first controller and the second controller to be on standby; and wherein in the common work mode, the main controller controls to display a public functional interface, the public functional interface provides two optional icons for entering two work states corresponding to the first and the second controllers; in the single work mode, the main controller controls to display a single functional interface, the single functional interface provides one optional icon for entering a work state corresponding to one controller which is activated by the main controller;

wherein the first controller is a media player controller for controlling audio/video applications, and the second controller is a mobile communications controller for controlling wireless communications applications;

wherein in the common work mode, the device displays the public functional interface for displaying a first group of basic information, and the first group of basic information comprises signal strength, battery capacity, current time and date, and the two optional icons for entering an Mp3 work state and a GSM work state; and wherein in the single work mode, the device displays the single functional interface for displaying a second group of basic information, and the second group of basic information comprises battery capacity, current time and date, and the optional icon for entering the Mp3 work state.

* * * * *